Feb. 2, 1954 — C. R. BURRELL — 2,667,767
RESILIENT WHEEL
Filed Jan. 14, 1950 — 2 Sheets-Sheet 1

INVENTOR.
Clarence R. Burrell
BY
Wood, Arey, Hinom & Swan
ATTORNEYS

Feb. 2, 1954 C. R. BURRELL 2,667,767
RESILIENT WHEEL

Filed Jan. 14, 1950 2 Sheets-Sheet 2

INVENTOR.
Clarence R. Burrell
BY
Wood, Arey, Henson & Evans
ATTORNEYS

Patented Feb. 2, 1954

2,667,767

UNITED STATES PATENT OFFICE 2,667,767

RESILIENT WHEEL

Clarence R. Burrell, Cincinnati, Ohio

Application January 14, 1950, Serial No. 138,693

2 Claims. (Cl. 64—11)

This invention relates to cushioned wheels of the type in which rubber or other resilient material is interposed between the wheel rim and the wheel hub, as distinguished from solid metal wheels. It is the purpose of the cushioning material to dampen vibrations which would otherwise cause excessive noise, as well as to absorb shocks or severe strains encountered during operation.

The principal objective of this invention has been to provide a cushioned wheel construction which is relatively inexpensive to manufacture, completely safe in operation, and readily demountable such that the cushioning material, when necessary, may be replaced conveniently. In the past, many designs for cushion wheels have been proposed utilizing separable members which are held together by cross bolts or by welding. However, in the welded type of construction, the cushioning material cannot be replaced except at the great expense of removing the welding seam, while the bolted type of construction, though conveniently demountable, is dangerously impractical because of the possibility of bolt failure in any environment where substantial side thrusts must be borne.

The wheels of the present invention embody a hub, a rim, and cushioning material disposed between the two, and to this extent they are similar to past designs. This invention, however, is predicated upon the concept of locating the cushioning material closely adjacent the outermost rim of the wheel upon a seat provided by a flange extending outwardly from the wheel hub, and sustaining the cushioning material in place by means of a keeper member which resides in press-fit connection with the hub. The keeper member, when in press-fit with the hub, maintains the parts in operative assembly, whence its name; but it additionally may also have its outermost periphery configurated to provide a seat for the cushion which complements the cushion seat provided by the flange; or it may, in conjunction with the flange, constitute the means for supporting the resilient mounting uniformly, in order that the concentricity between the hub and wheel rim will be maintained under adverse working conditions. By angulating seat surfaces of the flange and keeper toward one another, the cushioning material may be compressed, or preloaded in the assembling of the component parts, to adapt the design for special loads or special working conditions, and to prevent undesired looseness.

The wheels of the present invention are adapted for use in a wide variety of environments, as wheels of railway vehicles, cars or cranes, where the elimination of noise is an important advantage. In this environment, the outer rims may be flanged at one or both sides for guided rolling movement on a track. On the other hand, the wheels of this invention also are adapted for use as gears with teeth being cut upon the outer peripheries of the rims, in which event the rubber cushioning material eliminates gear noise and safeguards the teeth against excessive shock, wear or damage.

A press-fit between cooperating parts is commonly considered to be reliable and durable only so long as the load to which the fit is subjected does not exceed the force required to press the component parts into engagement with one another. Inasmuch as such loads are not predictable with any degree of certainty in railway vehicles, cranes or even gears, a press-fit might be considered too uncertain to be used with safety for the certain purposes. However, the present invention particularly contemplates constructions in which one member of the wheel in the form of a sleeve engages the associated member in the form of a stub over a substantial length in press or shrink-fit connection. One of these members may be the hub and the other the keeper. Any load imposed laterally on the rim will be an unbalanced load to the extent that it will not, at once, extend all the way around the rim, and by virtue of such unbalance, as well as the length of engagement throughout which the press-fit extends, the loading which the press-fit must sustain will be manifest only as a canting of the one member on the other, to make their engagement all the more secure. For this reason the constructions of the present invention are adapted for use under the most severe working requirements, where successions of shocks or high strains caused by lurching of cars or by uneven tracks are frequently encountered.

From the foregoing principles on which the present invention is predicated and the following description of the drawings in which various embodiments of the invention are illustrated, those skilled in the art will comprehend various modifications to which the invention is susceptible.

Figure 1:
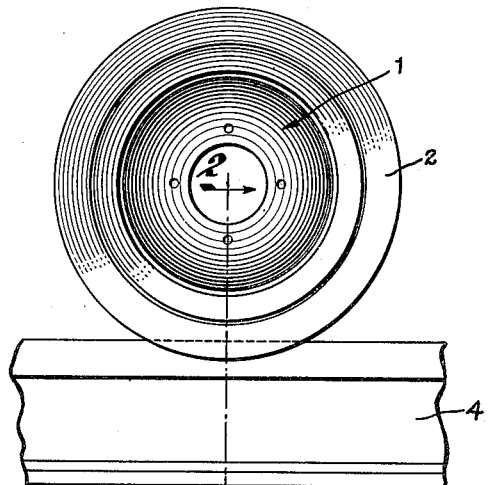
Figure 1 is a side elevation of a cushioned wheel of the invention shown in rolling engagement on a track.
Figure 2:
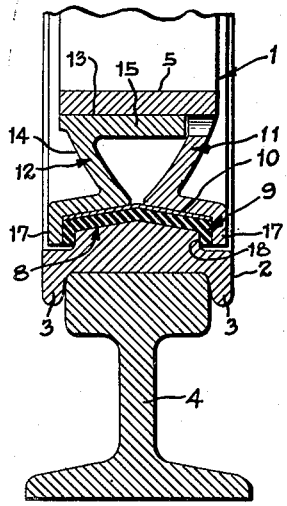
Figure 2 is a cross-sectional view taken on the line 2—2 of Figure 1, on a somewhat enlarged scale, showing the arrangement of the parts in section through half of the wheel.

In the construction shown in Figures 1 and 2, the hub of the wheel is indicated generally at 1, and the outermost rim at 2. The rim may have flanges 3—3 at one or both sides so that the wheel may engage, and be guided by, a track 4.

The hub 1 of the wheel may be arranged for mounting on an axle in any suitable manner; for purposes of illustration the hub portions are shown in the accompanying drawings as embodying bores 5; but, depending on the circumstances, the hubs may be arranged to be fixed permanently on a shaft, or demountably keyed to it, or be mounted upon anti-friction bearings supported by a shaft, or the like. The mounting of the wheel upon the shaft constitutes no part of the present invention.

Figure 3:
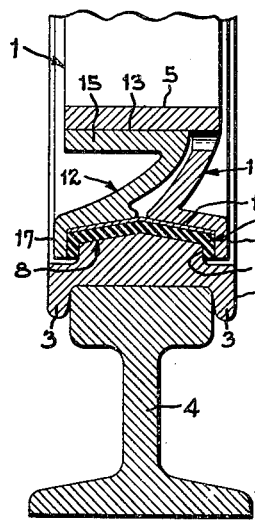
Figures 3, 4 and 5 are views similar to Figure 2 showing modified constructions.
Figure 4:
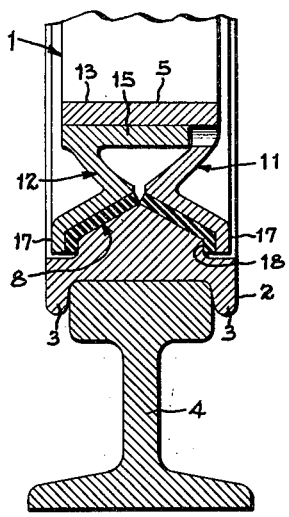

The rim 2 is of ring construction, and its interior surface constitutes a seat indicated generally at 8 which, in the constructions shown in Figures 2, 3 and 4, engages a band or layer of cushioning material indicated generally at 9. The cushioning material may be any composition of suitable resiliency in respect to the service expected of the wheel, such as natural rubber, or a synthetic rubber, such as neoprene. The innerface of the cushioning material, in the construction shown in Figure 2, is engaged by a metal facing member 10 which may be of strip form, cut to length and laid in place.

In the preferred construction, the interconnection between the hub 1 of the wheel and the cushioning material 9 (or steel band with which it is faced) is constituted by members 11 and 12, member 11 being a flange integral with the hub and extending outwardly from it, while member 12 constitutes a keeper which is in press or shrink-fit connection with the hub. Thus, the flange portion 11 extends outwardly from the hub at one side thereof, leaving a portion of the hub which is of substantial length available to be machined in the formation of the press-fit, as indicated by the surface 13. Keeper member 12, according to the form shown in Figure 2, comprises a flange portion 14 which is similar in shape to the flange portion 11 but oppositely arranged, while a skirt 15 is provided at the central portion of the keeper member, this skirt being bored accurately for frictional interconnection with the machined surface of the hub under a given force at a given temperature.

The outer peripheries of flange 11 and keeper 12 are configurated to provide seat surfaces which engage the metal cushion facing 10 and thereby support the rim of the wheel resiliently upon the hub. Preferably, the seat surfaces of the flange and keeper are inclined toward one another, and the interior peripheral surface of the rim is chamfered inwardly from its opposite edges at similar angles so that the cushioning material, in cross-section, is of V-shape, the apex of the V being approximately intermediate the edges of the rim. This particular configuration is especially desirable because it prevents lateral displacement of the rim portion of the wheel with respect to the hub. It is also advantageous in that it enables flat strip cushioning material to be employed. In wheel construction to be utilized under operating conditions in which the lateral load factors are not substantial, the chamfer of the seat surfaces at the interior of the rim may be omitted and a rubber strip, triangular in cross-section, utilized in place of the flat form of strip. Under these circumstances, the compressional load impressed on the triangular shaped rubber cushion during assembly would provide a frictional interconnection between the hub and rim, at least of sufficient strength to resist light loads.

In the assembly of the wheel, since the skirt of the keeper is pressed onto the machined surface of the wheel hub, the cushioning material eventually becomes compressed between the rim and the seat surfaces of the keeper and flange and may, therefore, be stressed to the extent desired in accordance with the wheel service requirements.

For providing cushioning of the rim in a direction laterally of the wheel, in conjunction with the cushioning provided diametrically of the wheel just described, the outer peripheral edges of the keeper and flange may terminate in flange portions 17 respectively, and the internal periphery of the rim may be provided with shoulders 18 respectively, the shoulders 18 being spaced appropriately from the flanges 17 to provide recesses within which cushioning material may reside. Thus, the cushion material shown in Figure 2 may be V-shaped in cross-section, and preformed to embody additional side walls. The cushioning material may be of one piece, preformed construction such that a strip cut to a length slightly less than the internal periphery of the rim may be laid against the rim, or one or more flat strips may be utilized.

During prolonged usage the cushioning material may wear, become oxidized or deteriorate, and require replacement. For this purpose, the keeper is designed so that it may be removed from the hub. To permit detachment of the keeper, a series of small holes is bored through the flange 11 in alignment with the end of the skirt 15 of the keeper. Metal pins inserted through these holes will engage the end of the skirt and, when pressure is asserted on the pins in uniform manner, the skirt will be dislodged. It is contemplated, of course, that assembly and disassembly be conducted in a power press.

For some purposes it may be desirable to utilize shrink-fit rather than press-fit connection between the keeper and the hub. The skirt portion 15 of the construction shown in Figure 2 could be heated in assembly of the skirt with the hub, but the application of heat to the skirt in order to disassemble the wheel would be difficult without also heating the hub, and the pin demounting method just described might be inadequate to effect dislodgement of a skirt which was shrunk onto the hub. However, a construction as shown in Figure 3 is adapted particularly for such shrunk-fit connections. In this arrangement, the parts are similar in principle and function to those described in Figure 2, but the keeper 12 has a skirt which extends outwardly, away from flange 11 rather than inwardly toward it. The skirt, therefore, is always accessible to the heat of a torch, whether the wheel is assembled or disassembled. Therefore, in the demounting of an assembled wheel, heat is applied to the exposed periphery of the skirt, meanwhile the hub being cooled to keep it from heating until the difference between the temperatures of two parts enables the keeper to be dislodged.

In the drawings, the exterior surface of the hub is in press or shrink-fit connection with the interior surface of the keeper skirt. However, the relationship of these parts may be just the reverse with equally satisfactory results, that is, the exterior of the skirt of the keeper being machined and sufficiently long to form a press-fit connection with the interior of the hub. In this event, the interior of the skirt may be adapted to engage an axle or to receive an anti-friction bearing which, in turn, engages the axle.

In Figure 4 a modified form of construction is shown in which the inner surface of the chamfered rim portion of the wheel is angulated to a greater extent than the forms shown in Figures 2 and 3. In this construction the cushioning material is not subjected to substantial shearing forces in assembly of the components of the wheel and the slip effect provided by the sheet metal facing 10 is not required.

Figure 5:
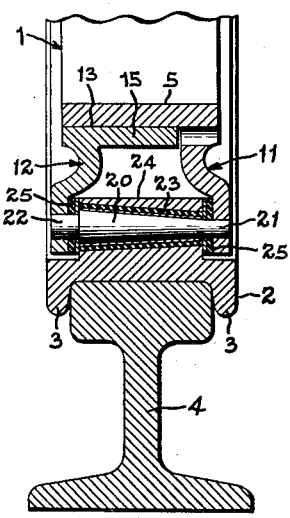

Figure 5 shows a car wheel construction in which the interconnection between the rim and hub is provided by a plurality of studs surrounded with resilient material and having their endwise portions supported respectively in bores in the flange 11 and the keeper 12. This arrangement provides a positive, although cushioned, driving connection between the hub and the rim which is adapted for driver wheels and the like where slippage, which might occur along the cushion faces in the previous constructions, could not be tolerated. The cross studs 20 terminate in stud ends 21 and 22, but preferably are tapered from one end to the other in their central portions. In the tapered areas the studs are surrounded by resilient shields 23. These resilient shields, which conform externally to the taper of the studs, are received respectively in aligned tapering bores extending through an interior annular portion 24 of the rim 2. The inner faces of the flange 11 and keeper 12 adjacent their outer peripheries are spaced from the sidewise edges of the annular rim portion 24 for the reception of lateral thrust cushions 25. Movement of the keeper toward the flange 11 exerts a compressive effect upon all cushions for the preloading thereof.

Figure 6:
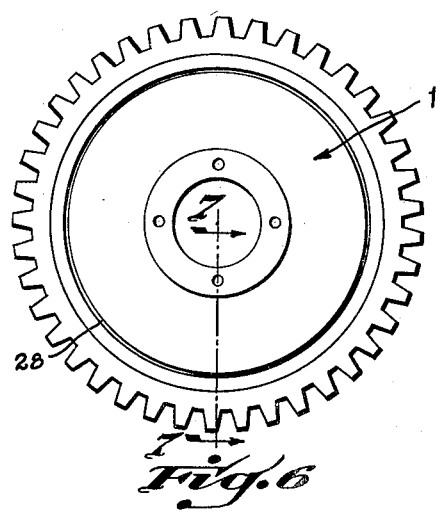
Figure 6 is a view of a cushioned gear wheel of the present invention.
Figure 7:
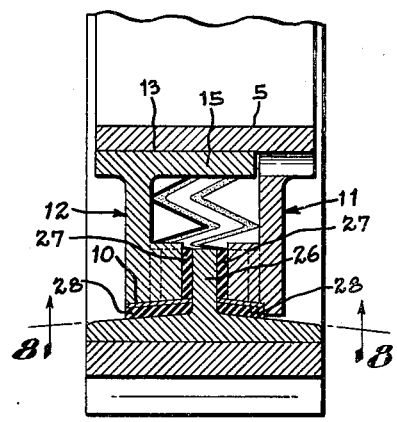
Figure 7 is a sectional view taken on the line 7—7 of Figure 6 showing a driving interconnection between the hub of the wheel and the rim of the wheel through a cushion.
Figure 8:
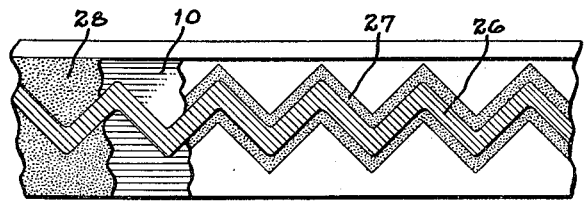
Figure 8 is a developed sectional view taken on the line 8—8 of Figure 7.

Another arrangement for positive, though resilient, driving interconnection between a hub and rim member is shown in Figures 6–8. In this construction the rim of the wheel which is of ring formation, has an inwardly extending rib 26 which is of serpentine configuration. Flange 11 and keeper 12 have their inner faces adjacent their outer peripheries similarly shaped, and strips of rubber cushioning material 27—27 are interposed between the side faces of serpentine rib 26 and the correspondingly configurated faces of the flange and keeper respectively. The facets constituted by the serpentine configuration at the opposite sides of the rib thus provide teeth which cooperatively bear upon the corresponding facets of the flange 11 and the keeper 12 through the interposed cushions 27—27 and, therefore, the rim and hub are arranged in positive driving connection. However, in addition, diametrical cushioning is provided by interposing the cushioning layers 28—28 intermediate the inner peripheral surfaces of the rim adjacent the rib and the outer peripheries of the keeper and flange in compressive arrangement substantially the same as that shown in Figure 2. It is desirable that the serpentine rib be formed by casting or forging to avoid excessive machining costs. Therefore, the outer rim of a wheel of this type may be of two-part construction; the innermost ring member, having the serpentine rib, being cast or forged, while the outermost member may be made of steel or alloy adapted to be hardened to withstand strain or wear. This type of construction is particularly suitable for use in gear wheels which are subjected to adverse surface conditions, but which are nevertheless to operate with a minimum of noise.

Having described my invention, I claim:

1. A resilient wheel comprising, a hub having a machined peripheral surface of substantial length, an outer rim of ring configuration having a layer of cushioning material at its internal periphery, the said hub, at an endwise portion thereof, having a flange extending laterally from the axis thereof, the said flange having an outer peripheral portion in circumferential supporting engagement with a portion of the said cushioning layer, and a keeper member having an outer peripheral portion in circumferential supporting engagement with another portion of said cushioning layer, the said keeper member having a central portion terminating adjacent the said flange, and being in tight frictional engagement with the said machined surface of the hub throughout substantially the entire length thereof, the said keeper member having a flange portion located adjacent the first said flange and interconnecting the central portion of the said keeper member with the said outer peripheral portion thereof.

2. A resilient wheel as defined in claim 1 wherein the first said flange has apertures extending therethrough in relative alignment with the end of the central portion of the said keeper member, whereby pins may be inserted through said apertures to facilitate disengagement of said keeper from said hub.

CLARENCE R. BURRELL.

References Cited in the file of this patent

UNITED STATES PATENTS

| Number | Name | Date |
|---|---|---|
| 623,883 | Cameron | Apr. 25, 1899 |
| 1,424,203 | Keller | Aug. 1, 1922 |
| 1,761,526 | Geyer | June 3, 1930 |
| 1,982,043 | Brownyer | Nov. 27, 1934 |
| 2,224,478 | Jones | Dec. 10, 1940 |
| 2,269,821 | Kemphert et al. | Jan. 13, 1942 |
| 2,477,874 | Hudson | Aug. 2, 1949 |